Jan. 6, 1925. Re. 15,979
C. P. SCHAEFER ET AL
CONSTRUCTION TIE
Original Filed Oct. 19, 1922
Fig. 1
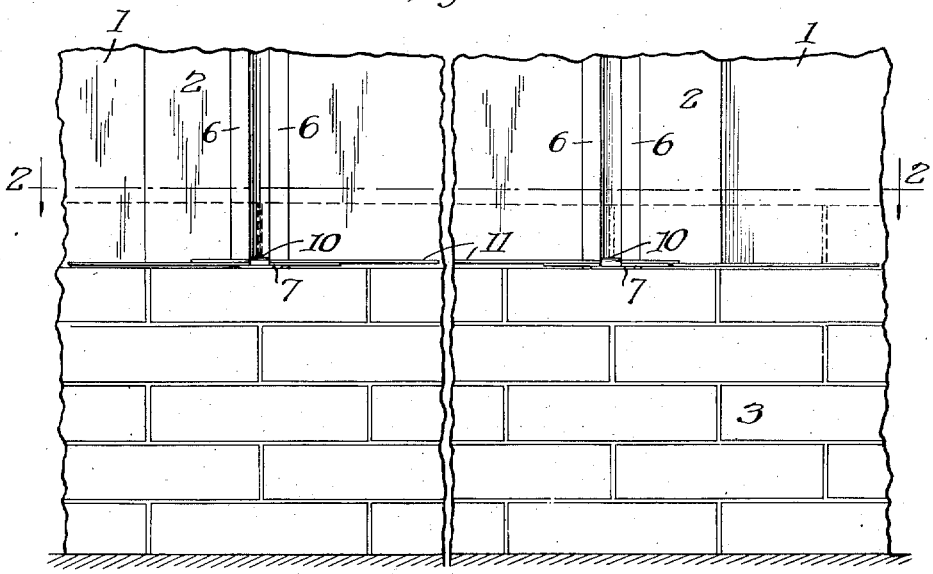
Fig. 2
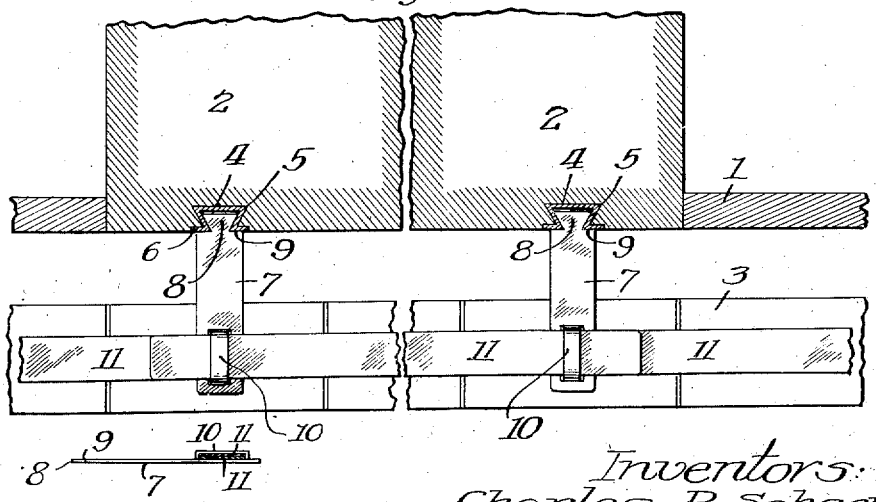
Fig. 3
Inventors:
Charles P. Schaefer
Robert M. Brown,
By Fisher, Fowle, Clapp & Sears.
Attys.

Reissued Jan. 6, 1925.

Re. 15,979

UNITED STATES PATENT OFFICE.

CHARLES P. SCHAEFER AND ROBERT M. BROWN, OF CHICAGO, ILLINOIS.

CONSTRUCTION TIE.

Original No. 1,472,194, dated October 30, 1923, Serial No. 595,626, filed October 19, 1922. Application for reissue filed November 1, 1924. Serial No. 747,372.

*To all whom it may concern:*

Be it known that we, CHARLES P. SCHAEFER and ROBERT M. BROWN, citizens of the United States, both residing at Chicago, in the county of Cook and State of Illinois, have invented certain new and useful Improvements in Construction Ties; and we do hereby declare the following to be a full, clear, and exact description of the invention, such as will enable others skilled in the art to which it appertains to make and use the same.

This invention relates to building structures, and particularly structures of concrete or the like having an outside veneer of brick, tile, cut stone of other suitable building blocks.

One of the principal objects of the invention is the provision of a means and method for binding structural elements to a surface of concrete or the like.

Other objects are to tie a veneering of brick or the like to a main building wall, ceiling or floor of concrete or the like, in a strong, simple and efficient manner; to facilitate erection of structures of the character mentioned; to improve the means of attachment; to avoid the necessity of using special forms of tile, bricks or other building blocks, and otherwise to simplify and improve the building operations of building structures.

The invention consists in the combination of elements and details of construction hereinafter more fully described, illustrated in the accompanying drawings, and defined in the appended claims.

In the drawings, in which is illustrated an improved embodiment of the invention—

Figure 1 is a fragmentary elevation of a wall of concrete or the like, after the form has been removed, a portion of an outer covering of veneer wall being shown partway completed, and adapted to be attached thereto in accordance with the principles of this invention.

Figure 2 represents a horizontal section on the line 2—2 of Figure 1.

Figure 3 is a side elevation of a key strip constituting one of the elements for anchoring the outer covering of veneer or blocks to the main elements of a wall, with the cross strip shown in section.

In the drawings:

The reference numeral 1 indicates as a whole the main portion of a building wall, and 2 represents columns or other massive and strong elements of the wall. These columns are intended to be made of concrete or similar material. A facing or veneer layer of brick, tile, or the like is illustrated at 3. This facing layer must be anchored to the main wall structure, as it is relatively thin, being constructed as in the example shown by a single tier of blocks.

In order to tie the veneer or facing wall to the main wall structure, means about to be described are provided. Molded perpendicularly in the concrete columns or other elements 2 are vertical grooves 4, which are dove-tailed in cross section or otherwise formed wider at their bottoms than at the exterior openings thereof. These grooves, sometimes known as undercuts, are here designated dove-tailed grooves, and may be of any desired form, so long as their bottoms are wider than the entrances thereto. In order to strengthen these grooves, besides forming them, they are lined with dovetailed channel members of metal, as indicated at 5. The said members 5 are intended to be molded in the concrete with their flanges 6 embedded flush with the surface of the elements 2. The said dovetailed grooves thus formed, extend continuously throughout the extent intended to be concealed by the veneer or facing wall. As the facing wall 3 rises, it will be anchored to the elements 2 by key strips 7. Said key strips are preferably made of flat metal, each having one end provided with a dovetailed tongue adapted to approximately fill the groove in the channel 5 when the said key strip 7 is disposed with its plane surface intersecting the axis of the groove.

In the form shown, the key strips 7 are provided with shoulders at 9, which engage the surfaces of the flush flanges 6 of the channel members. It is apparent that these key members 7 may be adjusted freely in the grooves, that they may be inserted edgewise in the groove and turned to a horizontal position, in which position they cannot be pulled out of the grooves. The ends of the key strips 7 opposite the tongues 8 are intended to overlie the course of bricks or other building blocks 3, and to be placed thereon. The said key strips may be made of any length desired in conformity with the thickness of the veneer wall and its proximity to the main elements of the walls 1 and 2. Adjacent the outer ends of each key strip 7 is provided a loop 10 which may be formed in any manner thereon, but which is preferably struck up from the metal of the key strips 7, as illustrated at Figure 3 of the drawings. This loop 10 is, of course, made in the usual manner by slitting the strip 7 a length equal to the width desired for the loop and pressing the portion between the strips out of the plane of the strip. The longitudinal strips 11 are extended between key strips 7 resting upon the same course of building blocks. Each section is preferably a little longer than the distance between centers of two adjacent key strips 7. The ends of adjacent tie strips 11 are inserted through the loop 10 of the key strip, so that the ends overlap within said loop. Thus the tie strips 11 extend longitudinally of a course of bricks or the like to aid in tying the bricks longitudinally, and are themselves spaced from and tied to the main elements or columns 2 by means of the key strips 7. The tie strips 11 and the key strips 7 being made as shown, of flat, relatively thin, although tough and strong metal, do not occupy any great height, but lie flat upon a course of bricks, and may be imbedded in a layer of cement or mortar between, upon which they rest and the courses imposed above.

It will be understood that the illustrations are somewhat diagrammatic, and simply for the purpose of clearly illustrating the invention. Such a number of key strips 7 will be used as will firmly anchor the facing wall to the main structure. The key strips and tie strips may be inserted at any suitable distance apart as may be found necessary. As has been before pointed out, they may be anchored to the building at any point, since the key strips 7 are free to be moved along the grooves and channels 4 and 5. No special form of building block is required in order to anchor the keys, the ordinary rectangular brick being preferably adapted to be secured in accordance with this improvement.

We are aware that many changes may be made, and numerous details of construction varied throughout a wide range without departing from the principles of this invention, and we, therefore, do not purpose limiting the patent granted hereon otherwise than as necessitated by the prior art.

What we claim and desire to secure by Letters Patent of the United States is:—

1. In a building structure, a main wall element having dove-tail grooves, having in cross section a wider interior than entrance, a veneer of building blocks, key strips having one end dove-tailed to fit the grooves, the other ends of said key strips overlying a course of blocks, and tie strips secured to the overlying ends of said key strips at right angles to them and overlying said course.

2. In a building structure, a main wall element having dove-tail grooves, having openings narrower than the interior, a veneer of building blocks, key strips having one end dove-tailed to fit the grooves, the other ends of said key strips overlying a course of blocks, and tie strip sections having overlapped ends secured to the key strips at right angles to them and overlying said course.

3. In a building structure, a main wall element of cementitious material molded to form in such material dove-tail grooves, metallic channel members provided each with a dove-tailed groove and embedded in and held in place by the front wall of the grooves of said wall element, a veneer of building blocks, key-pieces having one end shaped to enter and lock within the channel members, the other ends of said key-pieces overlying a course of blocks.

4. In a building structure, a main wall element having vertical dove-tail grooves in one face, a veneer of building blocks, flat key strips having one end dove-tailed, adapted to fit in said grooves, the other ends overlying a course of blocks, loops in said last-named ends, and flat tie strips passed through said loops from key strip to key strip, over a course of blocks, and adapted to be embedded in a layer of cement between courses.

5. In a building structure, a main wall element, dove-tail grooves in one face of said main wall element, a veneer of building blocks, flat key strips having one end adapted to fit in said grooves, the other ends overlying a course of blocks, loops raised above the upper surfaces of said last-named ends, and flat tie strip sections having overlapped ends engaged in said loops, and extending from key strip to key strip over a course of blocks, said key strips and tie strips adapted to be embedded in a layer of cement between courses.

6. A building structure comprising a main supporting element, dove-tail grooves in the surface thereof, a facing element in conjunction with the main element, key strips, having one end of each of said key strips adapted to fit the grooves, the other end being looped to receive tie strips at right angles, said tie strips adapted to be embedded in joints of the facing element.

7. A building construction comprising a concrete element, metallic lined grooves in the surface of said element, the entrance to said grooves being narrower than the interior thereof, the metallic linings of said grooves being overlapped at their front by the concrete element to hold said linings in place, a facing element in conjunction with the main concrete element, key pieces having one end adapted to fit said grooves, the other end engaging the facing element at right angles.

8. A building construction comprising a main element, metallic channels in said element, having in cross section a greater width than entrance thereto, an outwardly projecting flange at each side of the entrance and extending lengthwise substantially from end to end thereof, a veneer construction in conjunction with the main element, and means slidable in said channels, adapted to cooperate with said veneer, and maintain same in desired relation to the main element.

9. A building construction comprising a wall, the body material whereof is shaped to form dove-tail grooves in the face of the wall, a supported element and key means having parts to interlock with said grooves and parts to engage said supported element.

10. A building construction comprising a concrete element with grooves molded in the surface thereof, the entrance to said molded grooves being narrower than the interior thereof, a facing element in conjunction with the main concrete element, key strips having one end adapted to fit said grooves, the other end engaging the facing element.

11. A building construction comprising a main wall the body material whereof is shaped to form undercut grooves in its outer surface, an outer facing, key strips for binding the facing to the main wall, having inner end portions adapted to be inserted into and interlock with said undercut grooves.

12. A building construction comprising a main element the body material whereof is molded to form dove-tail grooves therein, a veneer construction in connection with said main element, and means slidable in said grooves and adapted to interlock at one end with said main element and at the opposite end to engage with said veneer construction.

13. A building construction comprising a molded concrete wall, a facing wall formed of individual blocks, said concrete wall having its surface material molded to form dove-tail grooves longer than the height of said individual blocks, and key strips having their inner ends provided with means to interlock with said grooves and having projecting parts adapted to set between said blocks.

CHARLES P. SCHAEFER.
ROBERT M. BROWN.